United States Patent
Oh

(10) Patent No.: US 12,412,888 B2
(45) Date of Patent: Sep. 9, 2025

(54) NEGATIVE ELECTRODE ACTIVE MATERIAL FOR NON-AQUEOUS ELECTROLYTE SECONDARY BATTERY COMPRISING SILICON OXIDE COMPOSITE AND MANUFACTURING METHOD THEREOF

(71) Applicant: DAEJOO ELECTRONIC MATERIALS CO., LTD, Siheung-Si Gyeonggi-do (KR)

(72) Inventor: Seung Min Oh, Siheung-Si (KR)

(73) Assignee: DAEJOO ELECTRONIC MATERIALS CO., LTD., Siheung-si (KR)

( * ) Notice: Subject to any disclaimer, the term of this patent is extended or adjusted under 35 U.S.C. 154(b) by 183 days.

(21) Appl. No.: 16/768,275

(22) PCT Filed: Dec. 3, 2018

(86) PCT No.: PCT/KR2018/015213
§ 371 (c)(1),
(2) Date: May 29, 2020

(87) PCT Pub. No.: WO2019/108050
PCT Pub. Date: Jun. 6, 2019

(65) Prior Publication Data
US 2021/0184204 A1    Jun. 17, 2021

(30) Foreign Application Priority Data

Dec. 1, 2017  (KR) ........................ 10-2017-0164207
Dec. 3, 2018  (KR) ........................ 10-2018-0154038

(51) Int. Cl.
*H01M 4/36* (2006.01)
*H01M 4/02* (2006.01)
(Continued)

(52) U.S. Cl.
CPC ............. *H01M 4/364* (2013.01); *H01M 4/04* (2013.01); *H01M 4/366* (2013.01); *H01M 4/48* (2013.01);
(Continued)

(58) Field of Classification Search
CPC ........ H01M 4/04; H01M 4/364; H01M 4/366; H01M 4/48; H01M 4/5825; H01M 2004/027; H01M 10/0525
See application file for complete search history.

(56) References Cited

U.S. PATENT DOCUMENTS

2005/0186475 A1  8/2005 Jeong et al.
2013/0189575 A1  7/2013 Anguchamy et al.
(Continued)

FOREIGN PATENT DOCUMENTS

CN  103579593 A  2/2014
CN  106356508 A  1/2017
(Continued)

OTHER PUBLICATIONS

Chen, Si/Mgo Composite anodes for Li-ion batteries, 2011, Rare Metals vol. 30, No. 2, Apr. 2011, p. 166 (Year: 2011).*
(Continued)

*Primary Examiner* — Matthew T Martin
*Assistant Examiner* — Ankith R Sripathi
(74) *Attorney, Agent, or Firm* — Sughrue Mion, PLLC

(57) ABSTRACT

The present disclosure relates to a negative electrode active material for non-aqueous electrolyte secondary battery, and a negative electrode active material for non-aqueous electrolyte secondary battery according to an embodiment of the present disclosure comprises a silicon oxide composite comprising silicon, silicon oxide ($SiO_x$, $0<x\leq 2$) and magnesium silicate, and including pores with a size of 50 to 300 nm therein. The negative electrode active material for non-
(Continued)

aqueous electrolyte secondary battery comprising the silicon oxide composite according to the present disclosure solves a swelling problem by allowing the pores inside the silicon oxide composite to play a role of buffering expansion in the charging process, efficiently controls volume expansion by allowing stress caused by expansion and contraction generated during charging or discharging to be concentrated in the pores inside the silicon oxide composite, and can improve lifetime characteristics of the lithium secondary battery accordingly.

11 Claims, 4 Drawing Sheets

(51) Int. Cl.
- *H01M 4/04* (2006.01)
- *H01M 4/48* (2010.01)
- *H01M 4/58* (2010.01)
- *H01M 10/0525* (2010.01)

(52) U.S. Cl.
CPC .... *H01M 4/5825* (2013.01); *H01M 2004/027* (2013.01); *H01M 10/0525* (2013.01)

(56) References Cited

U.S. PATENT DOCUMENTS

| | | | |
|---|---|---|---|
| 2015/0380733 A1 | 12/2015 | Lee et al. | |
| 2016/0372753 A1* | 12/2016 | Fukasawa | H01M 10/052 |
| 2017/0271651 A1* | 9/2017 | Behan | H01M 4/139 |
| 2018/0090750 A1* | 3/2018 | Oh | H01M 4/364 |

FOREIGN PATENT DOCUMENTS

| | | |
|---|---|---|
| EP | 3136477 A1 | 3/2017 |
| JP | 2005-243640 A | 9/2005 |
| JP | 2010170943 A | 8/2010 |
| JP | 2012-033317 A | 2/2012 |
| JP | 2013030428 A | 2/2013 |
| JP | 2016-504722 A | 2/2016 |
| JP | 2016-219410 A | 12/2016 |
| KR | 20150113771 A | 10/2015 |
| KR | 101586816 B1 | 1/2016 |
| KR | 20170090449 A | 8/2017 |
| WO | 2015145521 A1 | 10/2015 |
| WO | 2016085953 A1 | 6/2016 |
| WO | 2016204366 A1 | 12/2016 |
| WO | 2017052281 A1 | 3/2017 |

OTHER PUBLICATIONS

Extended European Search Report issued in PCT/KR2018/015213, filed Dec. 3, 2018, (7 pages).

Thomas Scientific, "Database WPI", Week 201054, 2010, (2 pages). Database WPI, Week 201054, Thomson Scientific, An 2010-J83090, London, GB, 2017.

* cited by examiner

NEGATIVE ELECTRODE ACTIVE MATERIAL FOR NON-AQUEOUS ELECTROLYTE SECONDARY BATTERY COMPRISING SILICON OXIDE COMPOSITE AND MANUFACTURING METHOD THEREOF

BACKGROUND OF THE DISCLOSURE

Field of the Disclosure

The present disclosure relates to a negative electrode active material for non-aqueous electrolyte secondary battery comprising a silicon oxide composite and a manufacturing method thereof.

Related Art

A lithium secondary battery which has recently been spotlighted as a power source for portable small electronic devices is a high energy density battery which exhibits a discharge voltage more than twice as high as an existing battery using an aqueous alkaline solution by using an organic electrolyte.

Oxides formed of transition metals having a structure of enabling intercalation of lithium, such as $LiCoO_2$, $LiMn_2O_4$, $LiNi_{1-x}Co_xO_2$ (0<x<1), and the like have mainly been used as a positive electrode active material for lithium secondary batteries, and carbon-based materials in various forms including artificial graphite, natural graphite and hard carbon which enables intercalation and deintercalation of lithium have been applied as a negative electrode active material for lithium secondary batteries.

Although graphite has mainly been used as a negative electrode active material for lithium secondary batteries, graphite has a small capacity per unit mass of 372 mAh/g, and it is difficult to manufacture lithium secondary batteries having high capacities by using graphite.

A metal material such as Si, Sn, Al, Sb or the like has been examined as a new material which is capable of replacing a carbon-based negative electrode active material. It has been known that a charging or discharging process is performed in such a metal material by an alloying or non-alloying reaction with Li, and the metal material has a high capacity compared to graphite, i.e., a commercial negative electrode active material. However, metal such as Si, Sn, Al, Sb or the like causes large volume expansion or contraction in the process of performing an alloying or non-alloying reaction with Li, and has a problem of deteriorating lifetime characteristics due to micronization, loss of conduction path, and the like accordingly. Particularly, although Si has been known to be the most appropriate material as a high capacity negative electrode active material in aspects of discharge capacity (4,200 mAh/g) and discharge voltage (0.4 V), Si has shown a rapid drop in lifetime characteristics as degeneration of the active material is generated by expansion of a large volume reaching about 400% caused when Li ions are intercalated (charged) into the material.

There is Patent Laid-open Publication No. 10-2014-0042146 (Publication date: Apr. 7, 2014) as a patent prior art.

SUMMARY OF THE DISCLOSURE

In order to solve the above-mentioned problems of conventional techniques, an objective of the present disclosure is to provide a noble negative electrode active material for non-aqueous electrolyte secondary battery comprising a silicon oxide composite, the negative electrode active material capable of preventing rapid deterioration degree of lifetime according to volume expansion and contraction of lithium.

Another objective of the present disclosure is to provide a manufacturing method for manufacturing a negative electrode active material for non-aqueous electrolyte secondary battery comprising a silicon oxide composite.

Another objective of the present disclosure is to provide a non-aqueous electrolyte secondary battery containing the negative electrode active material for non-aqueous electrolyte secondary battery comprising the silicon oxide composite.

A negative electrode active material for non-aqueous electrolyte secondary battery according to an embodiment of the present disclosure comprises a silicon oxide composite comprising silicon, silicon oxide ($SiO_x$, 0<x≤2) and magnesium silicate, and including pores with a diameter of 50 to 300 nm therein.

FIG. 1 is an image of the surface of a silicon oxide composite according to an embodiment of the present disclosure photographed by Field Emission Scanning Electron Microscope (FE-SEM). Referring to FIG. 1, a negative electrode active material for non-aqueous electrolyte secondary battery according to an embodiment of the present disclosure comprises a silicon oxide composite comprising silicon, silicon oxide ($SiO_x$, 0<x≤2) and magnesium silicate, and including pores with a diameter of 50 to 300 nm disposed therein.

In the above-mentioned negative electrode active material for non-aqueous electrolyte secondary battery comprising the silicon oxide composite according to the present disclosure, the pores inside the silicon oxide composite may be displayed by image processing.

In the above-mentioned negative electrode active material for non-aqueous electrolyte secondary battery comprising the silicon oxide composite according to the present disclosure, the pores disposed inside the silicon oxide composite can play roles of solving a swelling problem and preventing rapid deterioration degree of lifetime due to expansion and contraction by playing a role of buffering expansion in the charging process. A negative electrode active material for non-aqueous electrolyte secondary battery comprising the silicon oxide composite according to the present disclosure efficiently controls the volume expansion, and can improve lifetime characteristics of the lithium secondary battery accordingly by allowing volume expansion generated during charging or discharging of a lithium secondary battery and stress according thereto to be concentrated in the pores inside the silicon oxide composite.

In the above-mentioned negative electrode active material for non-aqueous electrolyte secondary battery comprising the silicon oxide composite according to the present disclosure, the pores may be closed pores disposed inside the silicon oxide composite, and some of the pores may include opened pores leading to the outside.

In the above-mentioned negative electrode active material for non-aqueous electrolyte secondary battery comprising the silicon oxide composite according to the present disclosure, the pores may preferably be closed pores disposed inside the silicon oxide composite.

In the above-mentioned negative electrode active material for non-aqueous electrolyte secondary battery comprising the silicon oxide composite according to the present disclosure, the pores may have an average diameter of 50 to 300 nm.

In the above-mentioned negative electrode active material for non-aqueous electrolyte secondary battery comprising the silicon oxide composite according to the present disclosure, it may be inadequate for the pores to accept volume expansion of Si during charging or discharging of a lithium secondary battery since the pores have a too small size when the pores have an average diameter of less than 50 nm, and energy density may be decreased, and mechanical strength of the negative electrode active material including a large number of pores may be lowered since there are a large number of pores remained after accepting volume expansion of Si when the pores have an average diameter of more than 300 nm. Further, when mechanical strength of the negative electrode active material is lowered, the negative electrode active material may be destroyed in a battery manufacturing process such as a rolling process or the like performed after mixing and coating a slurry.

The above-mentioned negative electrode active material for non-aqueous electrolyte secondary battery comprising the silicon oxide composite according to the present disclosure can efficiently diffuse the lithium ions and can improve charging and discharging efficiencies of the lithium secondary battery by impregnating the pores with a non-aqueous electrolyte, thereby enabling lithium ions to be injected into the silicon oxide composite.

The above-mentioned negative electrode active material for non-aqueous electrolyte secondary battery comprising the silicon oxide composite according to the present disclosure may have a ratio of pore portion area to the entire cross-sectional area of the silicon oxide composite of 3 to 40%.

Volume expansion of the negative electrode active material cannot be inhibited during charging or discharging of a lithium secondary battery when the ratio of pore portion area is less than 3%, and the negative electrode active material may be destroyed during a battery manufacturing process (a rolling process or the like performed after mixing and coating a slurry) since mechanical strength of the negative electrode active material is lowered by a large number of pores existing inside the negative electrode active material when the ratio of pore portion area is more than 40%.

In the above-mentioned negative electrode active material for non-aqueous electrolyte secondary battery comprising the silicon oxide composite according to the present disclosure, the silicon may be crystalline or amorphous, expansion and contraction of the negative electrode active material during a charging or discharging process are decreased when silicon is amorphous, and battery performance may be improved when the negative electrode active material is used as a negative electrode active material for a secondary battery.

In the above-mentioned negative electrode active material for non-aqueous electrolyte secondary battery comprising the silicon oxide composite according to the present disclosure, the silicon oxide may be silicon dioxide.

In the above-mentioned negative electrode active material for non-aqueous electrolyte secondary battery comprising the silicon oxide composite according to the present disclosure, the negative electrode active material can form Li—Si—O and Si+$Li_2O$ by performing an irreversible reaction with lithium ions during a discharging process when the silicon oxide ($SiO_x$, $0<x\leq2$) is in an amorphous form. Therefore, initial efficiency may be lowered as the higher the content of silicon oxide is, the more an initial irreversible reaction is increased. In the above-mentioned negative electrode active material for non-aqueous electrolyte secondary battery comprising the silicon oxide composite according to the present disclosure, it is preferable that the silicon oxide is included in an amount of 5 to 45 mol % with respect to the total mole number of the silicon oxide composite.

When using the above-mentioned negative electrode active material for non-aqueous electrolyte secondary battery comprising the silicon oxide composite according to the present disclosure, volume expansion and lifetime characteristics may be lowered if the oxide silicon has a content of less than 5 mol %, and lifetime of a secondary battery mat be decreased as an initial irreversible reaction is increased if the oxide silicon has a content of more than 45 mol %.

The above-mentioned negative electrode active material for non-aqueous electrolyte secondary battery comprising the silicon oxide composite according to the present disclosure, the silicon oxide composite may be shown at a diffraction peak of 2θ=27.5° to 29.5° by Si(III) during X-ray diffraction analysis, and may have a silicon crystallite size of 1 to 20 nm calculated from Full Width at Half Maximum (FWHM) of the diffraction peak.

In the above-mentioned negative electrode active material for non-aqueous electrolyte secondary battery comprising the silicon oxide composite according to the present disclosure, the silicon oxide may have a ratio (Si/O) of the number of silicon atoms to that of oxygen atoms of 0.5 to 2.

In the above-mentioned negative electrode active material for non-aqueous electrolyte secondary battery comprising the silicon oxide composite according to the present disclosure, the negative electrode active material may further improve performance of the battery when the negative electrode active material is used as a negative electrode active material for a secondary battery by further inhibiting expansion and contraction of silicon since the silicon may be dispersed in magnesium silicate.

In the above-mentioned negative electrode active material for non-aqueous electrolyte secondary battery comprising the silicon oxide composite according to the present disclosure, the magnesium silicate may include at least one of $MgSiO_3$ and $Mg_2SiO_4$. The magnesium silicate may include $MgSiO_3$ as a main component. In the above-mentioned negative electrode active material for non-aqueous electrolyte secondary battery comprising the silicon oxide composite according to the present disclosure, the magnesium silicate may be a compound represented by general formula $Mg_xSiO_y$, ($0.5\leq x\leq 2$, $2.5\leq y\leq 4$).

In the above-mentioned negative electrode active material for non-aqueous electrolyte secondary battery comprising the silicon oxide composite according to the present disclosure, magnesium may be included in an amount of 2 to 40 wt %, preferably 4 to 30 wt %, and more preferably 4 to 20 wt % with respect to the total weight of the silicon oxide composite.

In the above-mentioned negative electrode active material for non-aqueous electrolyte secondary battery comprising the silicon oxide composite according to the present disclosure, initial charging or discharging efficiency may be decreased when magnesium is included in an amount of less than 2 wt %, and capacity retention rate and handling stability may be decreased when magnesium is included in an amount of more than 40 wt %.

In the above-mentioned negative electrode active material for non-aqueous electrolyte secondary battery comprising the silicon oxide composite according to the present disclosure, lifetime characteristics can be improved by enabling the magnesium silicate to play a role of inhibiting an initial irreversible reaction in the lithium secondary battery and by decreasing expansion or contraction amount of an electrode if the Li ions are rapidly increased, when using the negative electrode active material as a negative electrode active material for a secondary battery since it is difficult for the magnesium silicate to react with Li ions.

In the above-mentioned negative electrode active material for non-aqueous electrolyte secondary battery comprising the silicon oxide composite according to the present disclosure, the silicon oxide composite may have a specific gravity of 1.8 to 3.2, an average particle diameter of 0.5 to 20 μm, and a specific surface area of 1 to 40 $m^2/g$. Mechanical stability may be dropped if the silicon oxide composite has a specific gravity of less than 1.8, and charging or discharging capacity may be lowered when the negative electrode active material is used as a negative electrode active material for a secondary battery if the silicon oxide composite has a specific gravity of more than 3.2. Charging or discharging capacity per unit volume may be decreased as volume density is decreased if the silicon oxide composite has an average particle diameter of less than 0.5 μm, and dispersion of the slurry may be difficult, and an aggregation phenomenon may occur if a slurry is prepared using the negative electrode active material.

If the silicon oxide composite has an average particle diameter of more than 20 μm, a problem that lifetime of a secondary battery is lowered may be generated since it may be difficult to manufacture an electrode membrane, a negative electrode active material comprising a silicon oxide composite may be exfoliated from a current collector, and it is difficult to react lithium with the inside of the negative electrode active material.

The above-mentioned negative electrode active material for non-aqueous electrolyte secondary battery comprising the silicon oxide composite according to the present disclosure may comprise 2 to 40 wt % of magnesium with respect to the total weight of the silicon oxide composite.

The above-mentioned negative electrode active material for non-aqueous electrolyte secondary battery comprising the silicon oxide composite according to the present disclosure may comprise 25 to 40 wt % of oxygen with respect to the total weight of the silicon oxide composite.

In the above-mentioned negative electrode active material for non-aqueous electrolyte secondary battery comprising the silicon oxide composite according to the present disclosure, the silicon oxide composite may further comprise a carbon-containing coating layer on the surface thereof, and the carbon-containing coating layer may be included in an amount of 2 to 20 wt % with respect to the total weight of the silicon oxide composite. In the above-mentioned negative electrode active material for non-aqueous electrolyte secondary battery comprising the silicon oxide composite according to the present disclosure, the coating layer may be included in an amount of 2 to 20 wt %, more preferably 2 to 10 wt % with respect to the total weight of the silicon oxide composite. An effect of improving sufficient conductivity cannot be expected, and lifetime for an electrode of a lithium secondary battery may be deteriorated when the carbon-containing coating layer is included in an amount of less than 2 wt %, while discharge capacity may be decreased, and discharge capacity may be decreased, and charging or discharging capacity per unit volume may be lowered when the carbon-containing coating layer is included in an amount of more than 20 wt %.

In the above-mentioned negative electrode active material for non-aqueous electrolyte secondary battery comprising the silicon oxide composite according to the present disclosure, the carbon-containing coating layer may comprise at least one selected from the group consisting of amorphous carbon, carbon nanofiber, graphene, and graphene oxide.

In the above-mentioned negative electrode active material for non-aqueous electrolyte secondary battery comprising the silicon oxide composite according to the present disclosure, the coating layer can further improve performance of the lithium secondary battery since the coating layer can provide excellent electrical conductivity between particles of the silicon oxide composite. In the above-mentioned negative electrode active material for non-aqueous electrolyte secondary battery comprising the silicon oxide composite according to the present disclosure, the carbon-containing coating layer can improve performance of the lithium secondary battery by inhibiting a side reaction with an electrolyte.

In the above-mentioned negative electrode active material for non-aqueous electrolyte secondary battery comprising the silicon oxide composite according to the present disclosure, the carbon-containing coating layer disposed on the surface of the silicon oxide composite may have an average thickness of 1 nm to 5 μm, preferably 5 nm to 2 μm, and more preferably 10 nm to 1 μm.

Conductivity improvement can be obtained if the coating layer has an average thickness of 1 nm or more, and deterioration of battery capacity can be inhibited when the negative electrode active material is used as a negative electrode active material for a lithium ion battery if the coating layer has an average thickness of 5 μm or less. Initial efficiency may be lowered since an effect of increasing electrical conductivity by the above-mentioned carbon coating film is insignificant, and the negative electrode active material has a high reactivity with an electrolyte when the negative electrode active material is applied as a negative electrode active material for a secondary battery if the coating layer has an average thickness of less than 1 nm. A problem of increasing resistance may occur since the coating layer interrupts mobility of lithium ions if the coating layer has an average thickness of more than 5 μm.

In the above-mentioned negative electrode active material for non-aqueous electrolyte secondary battery comprising the silicon oxide composite according to the present disclosure, the silicon oxide composite may have a specific gravity of 1.8 to 3.2, an average particle diameter of 0.5 to 20 μm, and a specific surface area of 1 to 40 m2/g if the silicon oxide composite comprises the carbon-containing coating layer.

The above-mentioned negative electrode active material for non-aqueous electrolyte secondary battery comprising the silicon oxide composite according to the present disclosure may comprise 1.5 to 30 wt % of magnesium with respect to the total weight of the silicon oxide composite comprising the carbon-containing coating layer according to the present disclosure.

In the above-mentioned negative electrode active material for non-aqueous electrolyte secondary battery comprising the silicon oxide composite according to the present disclosure, the silicon oxide composite may comprise 15 to 33 wt % of oxygen with respect to the total weight of the silicon oxide composite comprising the carbon-containing coating layer according to the present disclosure.

A negative electrode according to an embodiment of the present disclosure may comprise the above-mentioned negative electrode active material for non-aqueous electrolyte secondary battery.

A non-aqueous electrolyte secondary battery according to an embodiment of the present disclosure may comprise the above-mentioned negative electrode active material for non-aqueous electrolyte secondary battery.

A non-aqueous electrolyte secondary battery according to an embodiment of the present disclosure may comprise the above-mentioned negative electrode for non-aqueous electrolyte secondary battery.

A method of manufacturing a non-aqueous electrolyte secondary battery according to an embodiment of the present disclosure may comprise:

a first step of injecting a mixture which is prepared by mixing silicon particles having an average particle size of 0.1 to 20 μm with silicon dioxide particles having an average particle size of 10 to 100 nm, and magnesium particles having an average particle size of 1 to 100 mm into a reactor;

a second step of adjusting pressure of the reactor to 0.001 to 1 torr;

a third step of heating the mixture and magnesium particles to 600 to 1600° C. to prepare a silicon oxide composite;

a fourth step of cooling the silicon oxide composite, and depositing the cooled silicon oxide composite on a metal plate; and a fifth step of pulverizing and classifying the cooled silicon oxide composite deposited on the metal plate into a powder with an average particle diameter of 0.5 to 15 μm.

In a method of manufacturing a non-aqueous electrolyte secondary battery according to an embodiment of the present disclosure, pores may be rarely formed inside the particles as silicon oxide composite particles of a vapor state are closely deposited on the metal plate if the deposition process is performed at a deposition temperature of 1200° C. or more, and the silicon oxide composite particles of the vapor state are not deposited on the metal plate if the deposition process is performed at a deposition temperature of 500° C. or less. Further, the silicon oxide composite particles of the vapor state may easily form pores on the metal plate in a deposition temperature range of 700 to 1000° C. The deposited lump may be manufactured into a silicon oxide composite having nanopores by pulverizing a deposited lump into a powder using a jaw crusher and a jet mill, and adjusting particle sizes of the powder through classification.

The method of manufacturing a non-aqueous electrolyte secondary battery according to an embodiment of the present disclosure may further comprise a sixth step of mixing the silicon oxide composite of the fifth step with a carbon source to obtain a mixture, and heat-treating the mixture at 600 to 1200° C., thereby forming a carbon-containing coating layer on the surface of the silicon oxide composite.

The carbon source may be at least one selected from the group consisting of methane, propane, butane, acetylene, benzene, and toluene.

The carbon-containing coating layer deposited in the silicon oxide composite may be formed by mixing the silicon oxide composite with the carbon source including one selected from carbon dioxide, argon, methane, ethane, propane, butane, a mixed gas of water vapor or hydrogen, hydrogen, acetylene, benzene and toluene, or a combined gas mixture thereof, and reacting the silicon oxide composite with the carbon source at 600 to 1200° C.

The process of mixing the silicon oxide composite with the carbon source may be performed by mixing the silicon oxide composite with the carbon source additionally including at least one selected from the group consisting of nitrogen, helium, argon, carbon dioxide, and water vapor.

The carbon source may be methane, a mixed gas comprising methane and an inert gas, or a mixed gas comprising methane and an oxygen-containing gas.

The gas mixture may additionally include a plurality of inert gases selected from the group consisting of nitrogen, helium and argon besides the carbon source.

The carbon source according to an embodiment of the present disclosure may be a mixed gas of $CH_4$ and $CO_2$, and the mixed gas of $CH_4$ and $CO_2$ may have a molar ratio of about 1:0.20 to 0.50, preferably about 1:0.25 to 0.45, and more preferably about 1:0.30 to 0.40.

The carbon source according to an embodiment of the present disclosure may be a mixed gas of $CH_4$, $CO_2$ and $H_2O$, and the mixed gas of $CH_4$, $CO_2$ and $H_2O$ may have a molar ratio of about 1:0.20 to 0.50:0.01 to 1.45, preferably about 1:0.25 to 0.45:0.10 to 1.35, and more preferably about 1:0.30 to 0.40:0.50 to 1.0.

The carbon source according to an embodiment of the present disclosure may be carbon monoxide (CO) or carbon dioxide ($CO_2$).

The carbon source according to an embodiment of the present disclosure may be a mixed gas of $CH_4$ and $N_2$.

The mixed gas of $CH_4$ and $N_2$ may have a molar ratio of about 1:0.20 to 0.50, preferably about 1:0.25 to 0.45, and more preferably about 1:0.30 to 0.40.

The silicon oxide composite having the coating layer disposed on the surface thereof may exhibit high conductivity by the coating layer if the gas mixture comprises water vapor. Amount of water vapor contained in the gas mixture is not limited, and a preferable amount of water vapor contained in the gas mixture may be 0.01 to 10 vol % based on 100 vol % of the total carbon source.

A negative electrode according to an embodiment of the present disclosure may comprise the above-mentioned negative electrode active material for non-aqueous electrolyte secondary battery.

A non-aqueous electrolyte secondary battery according to an embodiment of the present disclosure may comprise the above-mentioned negative electrode active material for non-aqueous electrolyte secondary battery.

A non-aqueous electrolyte secondary battery according to an embodiment of the present disclosure may comprise the above-mentioned negative electrode for non-aqueous electrolyte secondary battery.

A non-aqueous electrolyte secondary battery in which the above-mentioned silicon oxide composite is used in a negative electrode may be excellent in capacity retention rate and initial efficiency.

The silicon oxide composite may be comprised a negative electrode active material or a positive electrode active material with a binder and a conductive material for non-aqueous electrolyte secondary battery. The negative electrode active material may perform intercalation and deintercalation of lithium ions.

DESCRIPTION OF EXEMPLARY EMBODIMENTS

Figure 1:
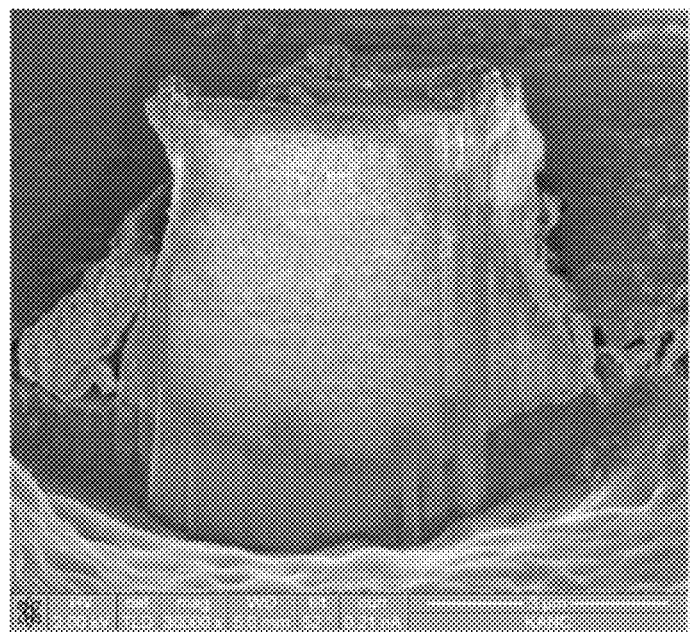
FIG. 1 is an image obtained by photographing the surface of a silicon oxide composite according to Example 1 to a magnification of 30,000 times by using a field emission scanning electron microscope (FE-SEM).
Figure 2:
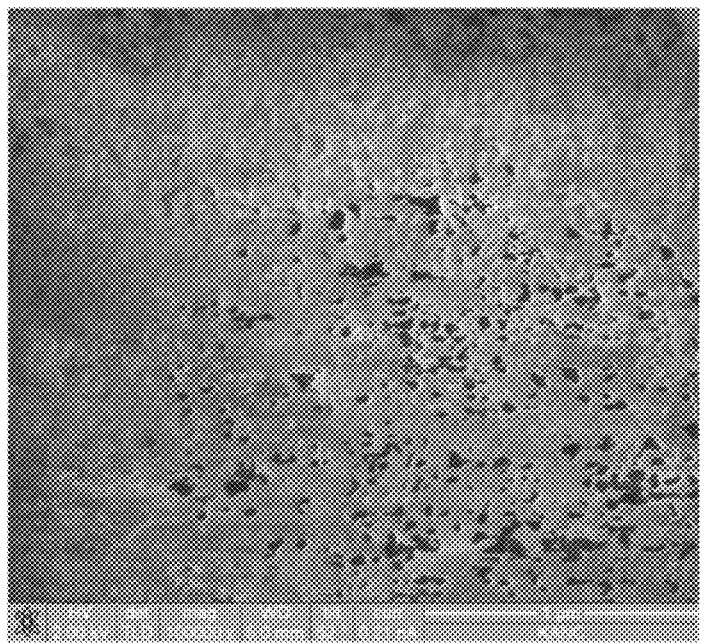
FIG. 2 is an image obtained by photographing the surface of a silicon oxide composite according to Example 1 to a magnification of 100,000 times by using the FE-SEM.
Figure 3:
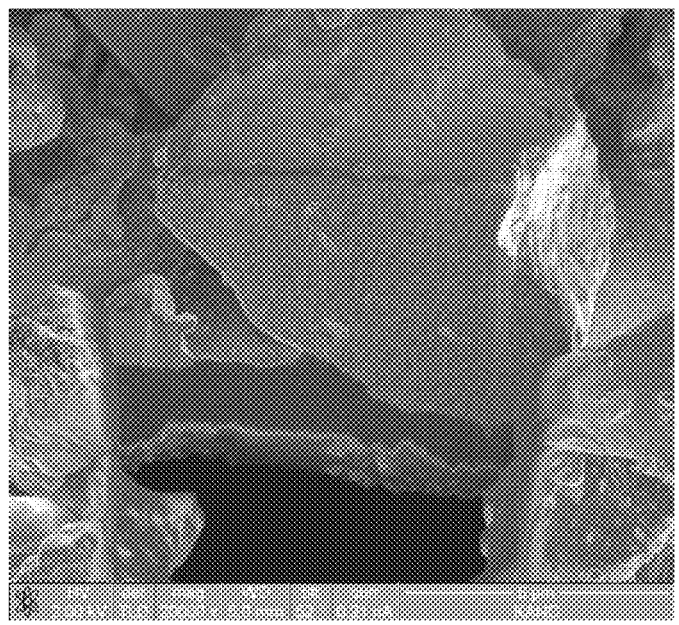
FIG. 3 is an image obtained by photographing the surface of a silicon oxide composite according to Example 2 to a magnification of 20,000 times by using the FE-SEM.
Figure 4:
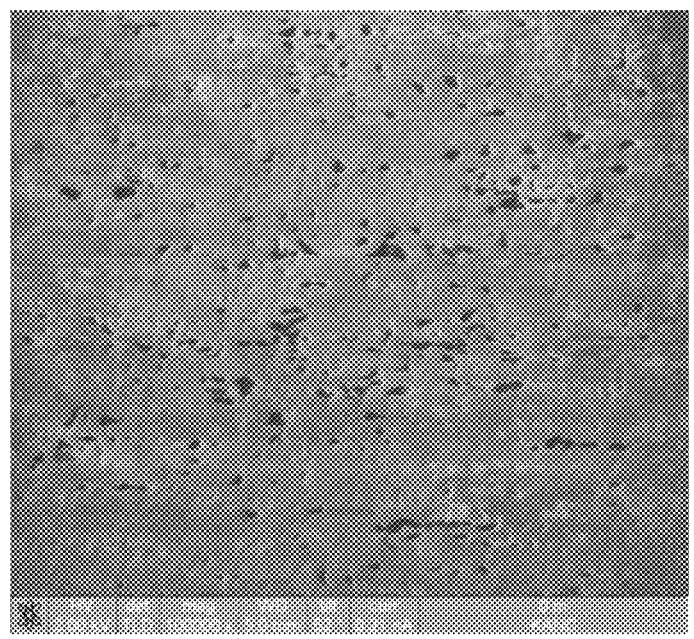
FIG. 4 is an image obtained by photographing the surface of a silicon oxide composite according to Example 2 to a magnification of 100,000 times by using the FE-SEM.
Figure 5:
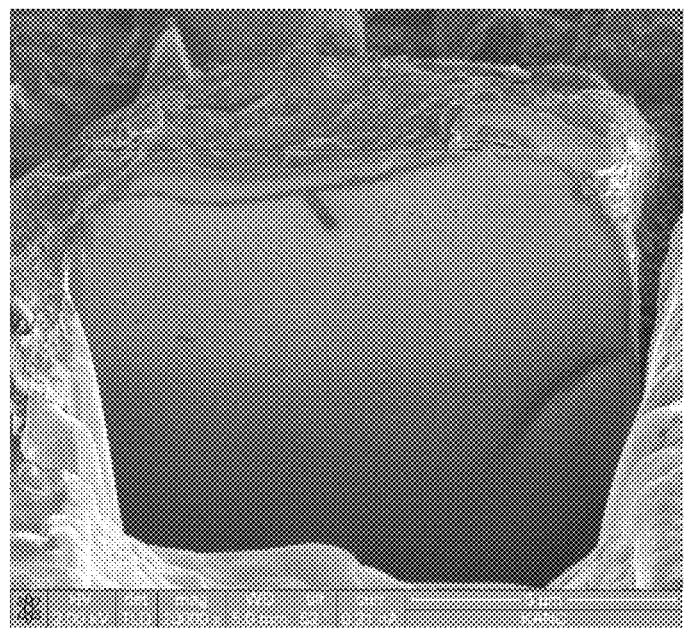
FIG. 5 is an image obtained by photographing the surface of a silicon oxide composite according to Example 3 to a magnification of 20,000 times by using the FE-SEM.
Figure 6:
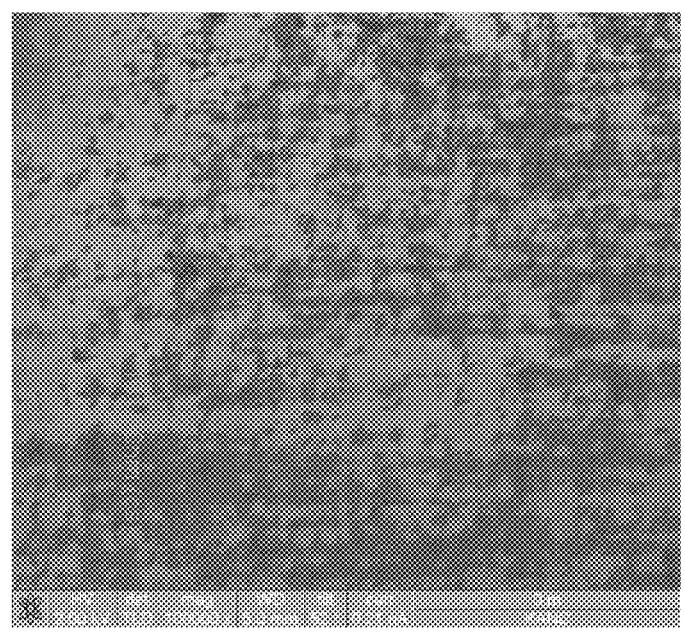
FIG. 6 is an image obtained by photographing the surface of a silicon oxide composite according to Example 3 to a magnification of 100,000 times by using the FE-SEM.
Figure 7:
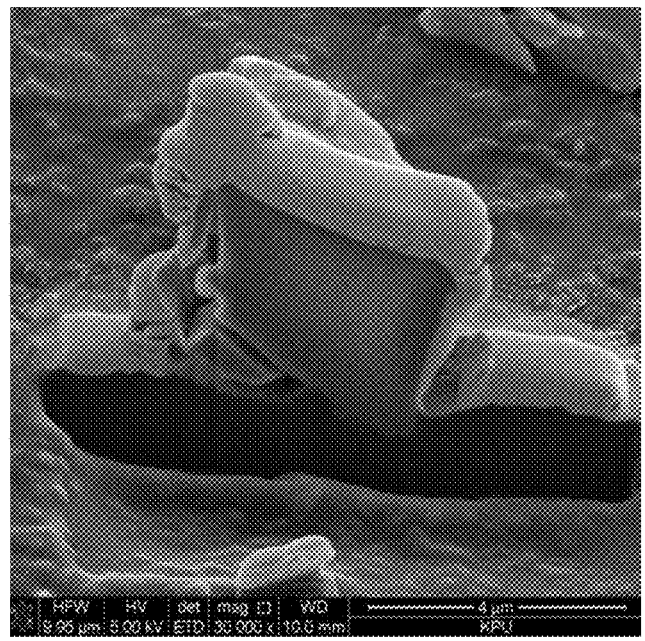
FIG. 7 is an image obtained by photographing the surface of a silicon oxide composite according to Comparative Example 1 to a magnification of 30,000 times by using the FE-SEM.
Figure 8:
FIG. 8 is an image obtained by photographing the surface of a silicon oxide composite according to Comparative Example 1 to a magnification of 100,000 times by using the FE-SEM.

Hereinafter, the present disclosure will be described in more detail by Examples. However, the present disclosure is not limited to the following Examples.

<Example 1> Preparation of a Magnesium-Containing Silicon Oxide Composite

After heat-treating 15 kg of a mixed powder obtained by uniformly mixing a silicon powder with a silicon dioxide ($SiO_2$) powder to a molar ratio of 1:1 and 1.5 kg of magnesium to 1,400° C. under a reduced-pressure atmosphere of 0.01 to 1 torr, thereby simultaneously generating a silicon oxide vapor caused by the mixed powder of the silicon powder and the silicon dioxide ($SiO_2$) powder, and a magnesium vapor such that the silicon oxide vapor and the magnesium vapor are reacted in a vapor phase to obtain a reaction product, cooling and precipitating the reaction product at 700° C. to obtain a precipitated reaction product, and pulverizing and classifying the precipitated reaction product by a jet mill, a magnesium-containing silicon oxide composite powder having an average particle diameter ($D_{50}$) of 6.3 μm was recovered.

A silicon oxide composite comprising 9 wt % of magnesium, the silicon oxide composite having a carbon coating layer containing 5 wt % of carbon formed thereon (sample 1) was prepared by performing a chemical vapor deposition (CVD) treatment process on the magnesium-containing silicon oxide composite powder under a mixed gas of argon (Ar) and methane ($CH_4$) at conditions of 1,000° C. and 2 hours by using a tube-type electric furnace in order to form a carbon-containing coating layer.

It was confirmed that the magnesium-containing silicon oxide composite (sample 1) had a BET specific surface area of 5.5 $m^2/g$, a specific gravity of 2.3 $g/cm^3$, an average particle diameter ($D_{50}$) of 6.3 μm, and a size of silicon crystal measured by X-ray diffraction analysis (CuKα) of 8 nm.

<Example 2> Preparation of a Magnesium-Containing Silicon Oxide Composite

A silicon oxide composite comprising 9 wt % of magnesium (sample 2) was prepared, and a silicon oxide composite powder having a carbon coating layer containing 5 wt % of carbon formed thereon was prepared by the same method as in Example 1 except that the reaction product was cooled and precipitated at 800° C. to obtain a precipitated reaction product.

It was confirmed that the magnesium-containing silicon oxide composite (sample 2) had a BET specific surface area of 6.2 $m^2/g$, a specific gravity of 2.3 $g/cm^3$, an average particle diameter ($D_{50}$) of 6.5 μm, and a size of silicon crystal measured by X-ray diffraction analysis (CuKα) of 8 nm.

<Example 3> Preparation of a Magnesium-Containing Silicon Oxide Composite

A silicon oxide composite comprising 4 wt % of magnesium (sample 3) was prepared, and a silicon oxide composite powder having a carbon coating layer containing 10 wt % of carbon formed thereon was prepared by the same method as in Example 1 except that the reaction product was cooled and precipitated at 900° C. to obtain a precipitated reaction product.

It was confirmed that the magnesium-containing silicon oxide composite (sample 3) had a BET specific surface area of 6.3 $m^2/g$, a specific gravity of 2.4 $g/cm^3$, an average particle diameter ($D_{50}$) of 6.2 μm, and a size of silicon crystal measured by X-ray diffraction analysis (CuKα) of 11 nm.

<Example 4> Preparation of a Magnesium-Containing Silicon Oxide Composite

A silicon oxide composite comprising 12 wt % of magnesium (sample 4) was prepared, and a silicon oxide composite powder having a carbon coating layer containing 7 wt % of carbon formed thereon was prepared by the same method as in Example 1 except that the reaction product was cooled and precipitated at 1000° C. to obtain a precipitated reaction product.

It was confirmed that the magnesium-containing silicon oxide composite (sample 4) had a BET specific surface area of 5.8 $m^2/g$, a specific gravity of 2.3 $g/cm^3$, an average particle diameter ($D_{50}$) of 6.8 μm, and a size of silicon crystal measured by X-ray diffraction analysis (CuKα) of 13 nm.

<Example 5> Preparation of a Magnesium-Containing Silicon Oxide Composite

A silicon oxide composite comprising 16 wt % of magnesium (sample 5) was prepared, and a silicon oxide composite powder having a carbon coating layer containing 4 wt % of carbon formed thereon was prepared by the same method as in Example 1 except that the reaction product was cooled and precipitated at 1100° C. to obtain a precipitated reaction product.

It was confirmed that the magnesium-containing silicon oxide composite (sample 5) had a BET specific surface area of 6.7 $m^2/g$, a specific gravity of 2.4 $g/cm^3$, an average particle diameter ($D_{50}$) of 6.7 μm, and a size of silicon crystal measured by X-ray diffraction analysis (CuKα) of 14 nm.

<Example 6> Preparation of a Magnesium-Containing Silicon Oxide Composite

A silicon oxide composite comprising 15 wt % of magnesium (sample 6) was prepared, and a silicon oxide composite powder having a carbon coating layer containing 5 wt % of carbon formed thereon was prepared by the same method as in Example 1 except that the reaction product was cooled and precipitated at 800° C. to obtain a precipitated reaction product.

It was confirmed that the magnesium-containing silicon oxide composite (sample 6) had a BET specific surface area of 5.2 m$^2$/g, a specific gravity of 2.3 g/cm$^3$, an average particle diameter ($D_{50}$) of 6.6 μm, and a size of silicon crystal measured by X-ray diffraction analysis (CuKα) of 14 nm.

<Example 7> Preparation of a Magnesium-Containing Silicon Oxide Composite

A silicon oxide composite comprising 15 wt % of magnesium, the silicon oxide composite having a carbon coating layer containing 15 wt % of carbon formed thereon (sample 7) was prepared by the same method as in Example 1 except that the reaction product was rapidly cooled and precipitated to obtain a precipitated reaction product.

It was confirmed that the magnesium-containing silicon oxide composite (sample 7) had a BET specific surface area of 7.2 m$^2$/g, a specific gravity of 2.0 g/cm$^3$, an average particle diameter ($D_{50}$) of 6.5 μm, and a size of silicon crystal measured by X-ray diffraction analysis (CuKα) of 12 nm.

<Comparative Example 1> Preparation of a Magnesium-Containing Silicon Oxide Composite A silicon oxide composite comprising 1 wt % of magnesium, the silicon oxide composite having a carbon coating layer containing 5 wt % of carbon formed thereon (sample 8) was prepared by the same method as in Example 1 except that the reaction product was naturally cooled and precipitated to obtain a precipitated reaction product.

It was confirmed that the magnesium-containing silicon oxide composite (sample 8) had a BET specific surface area of 5 m$^2$/g, a specific gravity of 2.2 g/cm$^3$, an average particle diameter ($D_{50}$) of 6.5 μm, and a size of silicon crystal measured by X-ray diffraction analysis (CuKα) of 8 nm.

<Comparative Example 2> Preparation of a Magnesium-Noncontaining Silicon Oxide Composite A silicon oxide composite having a carbon coating layer containing 5 wt % of carbon formed thereon (sample 9) was prepared by the same method as in Example 1 except that the mixed powder was heat-treated without adding magnesium to the mixed powder.

It was confirmed that the silicon oxide composite (sample 9) had a BET specific surface area of 6.5 m$^2$/g, a specific gravity of 2.0 g/cm$^3$, an average particle diameter ($D_{50}$) of 6.0 μm, and a size of silicon crystal measured by X-ray diffraction analysis (CuKα) of 5 nm.

Experimental Example 1

After measuring sizes of pores, area ratios of the pores (area ratios of pore portions to the total area in image-processed cross sections), $D_{50}$ values of silicon composite particles, specific gravities and specific surface areas of silicon composites, sizes of Si crystals, initial efficiencies of discharge capacities, and capacity retention rates in the above-mentioned silicon oxide composites prepared by Examples 1 to 7 and Comparative Examples 1 and 2, measurement results are shown in Table 1.

It can be confirmed from the Table 1 below that pores are not formed in particles of the silicon oxide composites if magnesium is not contained in the silicon oxide composite (Comparative Example 2), or if the silicon oxide composite is prepared by natural cooling although magnesium is contained in the silicon oxide composite (Comparative Example 1).

TABLE 1

Comparison of silicon oxide composites prepared by Examples 1 to 7, and Comparative Examples 1 and 2

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Content of Mg (wt %) | 9 | 9 | 4 | 12 | 16 | 15 | 15 | 1 | 0 |
| Size of pores (nm) (average) | 143 | 273 | 89 | 105 | 97 | 170 | 192 | Less than 1 nm | Less than 1 nm |
| Area ratio of pores (%) | 3.7 | 4.8 | 4.6 | 5.5 | 6.8 | 7.5 | 11 | Less than 0.1 | Less than 0.1 |
| $D_{50}$ value (μm) of silicon oxide composite particles | 6.3 | 6.5 | 6.2 | 6.8 | 6.7 | 6.6 | 6.5 | 6.5 | 6.0 |
| Specific gravity of silicon oxide composite (g/cm$^3$) | 2.3 | 2.3 | 2.4 | 2.3 | 2.4 | 2.3 | 2.0 | 2.2 | 2.0 |
| Specific surface area of silicon oxide composite (m$^2$/g) | 5.5 | 6.2 | 6.3 | 5.8 | 6.7 | 5.2 | 7.2 | 5.0 | 6.5 |

TABLE 1-continued

Comparison of silicon oxide composites prepared by Examples 1 to 7, and Comparative Examples 1 and 2

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Size of Si crystal (nm) | 8 | 8 | 11 | 13 | 14 | 14 | 12 | 8 | 5 |
| Discharge capacity (mAh/g) | 1352 | 1363 | 1407 | 1321 | 1261 | 1287 | 1275 | 1465 | 1577 |
| Initial efficiency (%) | 81.7 | 81.5 | 80.3 | 82.1 | 85 | 84.6 | 84.1 | 76 | 74 |
| 50 cycle capacity retention rate (%) | 87 | 80 | 91 | 87 | 91 | 83 | 80 | 80 | 81 |

Manufacturing Example

Negative electrodes for lithium secondary batteries comprising the above-mentioned silicon oxide composite powders prepared according to Examples and Comparative Examples as electrode active materials, and batteries (coil cells) were manufactured.

Negative electrode slurry compositions were prepared by mixing water with mixtures having the active materials, SUPER-P as a conductive material, and polyacrylic acid mixed therein at a weight ratio of 80:10:10.

Electrodes with a thickness of 70 μm were manufactured by applied the compositions to a copper foil with a thickness of 18 μm and drying the compositions applied to the copper foil, coil cell negative electrodes were manufactured by punching the electrode-applied copper foils into a circular shape with a diameter of 14 mm, and a metal lithium foil with a thickness of 0.3 mm was used as an opposite electrode.

A porous polyethylene sheet with a thickness of 0.1 mm was used as a separator, an electrode prepared by dissolving $LiPF_6$ with a concentration of 1M in a solution having ethylene carbonate (EC) and diethylene carbonate (DEC) mixed therein at a volume ratio of 1:1 was used as am electrolyte, and so-called 2032 type coin cells (batteries) having a thickness of 2 mm and a diameter of 32 mm were manufactured by applying the above-mentioned elements.

Experimental Example

After obtaining charge capacities (mAh/g), discharge capacities (mAh/g), and initial charging/discharging efficiencies (%) by charging the coin cells manufactured in Manufacturing Example when it was a voltage of 0.005 V at a constant current of 0.1 C, and discharging the coin cells manufactured in Manufacturing Example until it was a voltage of 2.0 Vat the constant current of 0.1 C, results thereof are shown in the above-mentioned Table 1.

Further, after obtaining cycle characteristics (50 cycle capacity retention rates) by performing one cycle of a charging and discharging process on the coin cells manufactured for each of the samples in Manufacturing Example, and charging the coin cells until it was a voltage of 0.005 V at the constant current of 0.1 C and discharging the coin cells until it was a voltage of 2.0 Vat the constant current of 0.1 C in the charging and discharging process from a second cycle, results thereof are shown in the above-mentioned Table 1.

It can be confirmed from the Table 1 above that, if pores are formed in the particles, 50 cycle capacity retention rates are greatly improved.

As a negative electrode active material for non-aqueous electrolyte secondary battery comprising a silicon oxide composite according to the present disclosure comprises the silicon oxide composite including pores with a size of 50 to 300 nm therein, a secondary battery comprising the negative electrode active material according to the present disclosure exhibits an effect of improving capacity characteristics while preventing rapid deterioration of lifetime due to volume expansion and contraction of Si.

What is claimed is:

1. A negative electrode active material for non-aqueous electrolyte secondary battery, the negative electrode active material comprising a silicon oxide composite and pores disposed inside the silicone oxide composite,
    wherein the silicon oxide composite comprises silicon, a silicon oxide (SiOx, 0<x≤2), and a magnesium silicate;
    wherein an average diameter of the pores is in a range from 143 nm to 300 nm;
    wherein the magnesium silicate comprises $MgSiO_3$;
    wherein the negative electrode active material has a ratio of a pore portion area to an entire cross-sectional area of the silicon oxide composite of 3 to 40%,
    wherein the negative electrode active material comprises 2 to 40 wt % of magnesium with respect to a total weight of the silicon oxide composite, and
    wherein the negative electrode active material comprises 25 to 40 wt % of oxygen with respect to a total weight of the silicon oxide composite.

2. The negative electrode active material for non-aqueous electrolyte secondary battery of claim 1, wherein the silicon oxide composite is shown at a diffraction peak of 2θ=27.5° to 29.5° by Si(III) during X-ray diffraction analysis, and has a silicon crystallite size of 1 to 20 nm calculated from Full Width at Half Maximum (FWHM) of the diffraction peak.

3. The negative electrode active material for non-aqueous electrolyte secondary battery of claim 1, wherein the silicon oxide has a ratio (Si/O) of the number of silicon atoms to that of oxygen atoms of 0.5 to 2.

4. The negative electrode active material for non-aqueous electrolyte secondary battery of claim 1, wherein the magnesium silicate further includes $Mg_2SiO_4$.

5. The negative electrode active material for non-aqueous electrolyte secondary battery of claim 1, wherein the silicon oxide composite has a specific gravity of 1.8 to 3.2, an average particle diameter of 0.5 to 20 μm, and a specific surface area of 1 to 40 $m^2/g$.

6. The negative electrode active material for non-aqueous electrolyte secondary battery of claim 1, wherein the silicon oxide composite further comprises a carbon-containing coating layer on a surface thereof, and the coating layer is included in an amount of 2 to 20 wt % with respect to a total weight of the silicon oxide composite.

7. The negative electrode active material for non-aqueous electrolyte secondary battery of claim 6, wherein the carbon-containing coating layer comprises one or more selected from the group consisting of amorphous carbon, carbon nanofiber, graphene, and graphene oxide.

8. The negative electrode active material for non-aqueous electrolyte secondary battery of claim 6, wherein the silicon oxide composite has a specific gravity of 1.8 to 3.2, an average particle diameter of 0.5 to 20 μm, and a specific surface area of 1 to 40 $m^2/g$.

9. The negative electrode active material for non-aqueous electrolyte secondary battery of claim 1, wherein the negative electrode active material comprises 4 to 30 wt % of magnesium with respect to the total weight of the silicon oxide composite.

10. A negative electrode comprising a negative electrode active material for non-aqueous electrolyte secondary battery according to claim 1, and a non-aqueous electrolyte secondary battery including the negative electrode.

11. The negative electrode active material for non-aqueous electrolyte secondary battery of claim 1, wherein an average diameter of the pores is in a range from 170 nm to 300 nm.

\* \* \* \* \*